Oct. 30, 1928.　　　　　　J. REID　　　　　　1,689,560

LUBRICATING DEVICE

Filed Oct. 20, 1927　　　　2 Sheets-Sheet 2

INVENTOR.
John Reid
BY Knight Bros

ATTORNEYS

Patented Oct. 30, 1928.

1,689,560

UNITED STATES PATENT OFFICE.

JOHN REID, OF OIL CITY, PENNSYLVANIA, ASSIGNOR TO JOSEPH REID GAS ENGINE COMPANY, OF OIL CITY, PENNSYLVANIA.

LUBRICATING DEVICE.

Application filed October 20, 1927. Serial No. 227,569.

This invention relates to a lubricating device for bearing surfaces having a vertical or substantially vertical position, and is particularly adapted for use in connection with a cup or reservoir mounted upon one of the relatively movable members, which cup is adapted to retain oil flowing from the bearing surfaces.

The lubricating device comprises a disk extending from the oil retaining cup to the upper limit of the bearing surfaces, the disk being rotated to convey the oil from the cup to the bearing surfaces. In this way the oil can be kept flowing over the bearing surfaces in sufficient quantity to insure proper lubrication.

One example of the invention as applied to an eccentric driving mechanism for pumps will be described in the following specification and illustrated in the accompanying drawing in which—

Figure 1:
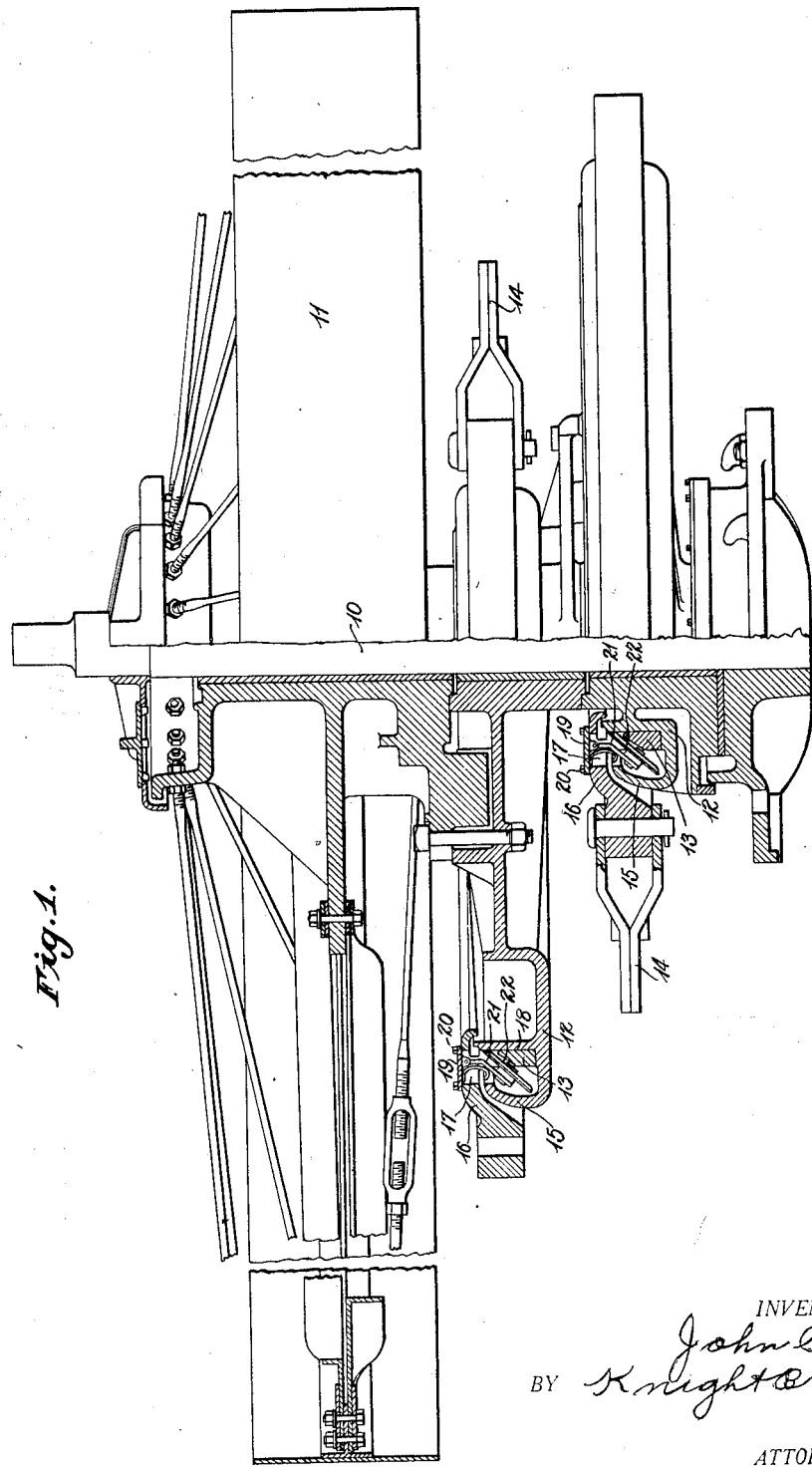
Figure 2:
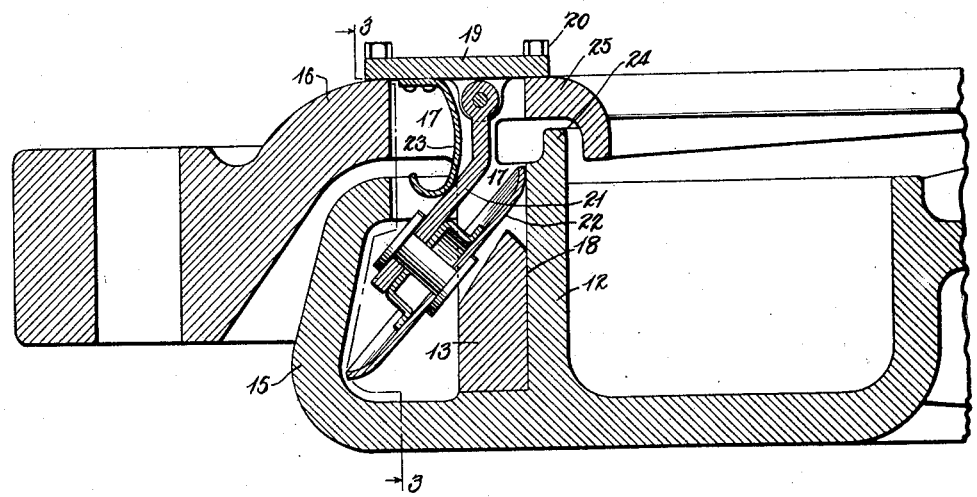
Figure 3:
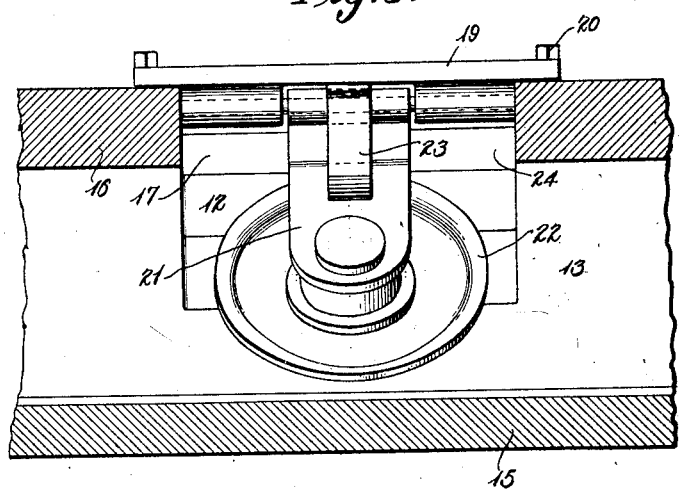

Fig. 1 shows a power wheel unit, half in elevation and half in section, illustrating the position of the lubricating device, Fig. 2 is a vertical section through the lubricating device and adjacent portions of the eccentric and eccentric ring, and Fig. 3 is a vertical section on the line 3—3 of Fig. 2.

In Fig. 1, 10 is a vertical shaft upon which are fixed a power wheel 11 adapted to be driven by a belt, and two eccentrics 12. The eccentrics are surrounded by eccentric rings 13 to which are pivoted pump connecting rods 14. The eccentrics have flanges 15 which form annular cups surrounding the eccentric rings adapted to retain oil flowing from the bearing surfaces. The eccentric rings have flanges 16 extending outwardly over the eccentric flanges 15. This construction is described in detail in my copending application Serial No. 201,412.

Each eccentric ring has an aperture 17 extending through to the bearing surfaces 18 and through the flange 16. A cover plate 19 is removably secured to flange 16 over the aperture 17 by cap screws 20, and to the cover plate is pivoted a support 21 upon which is rotatably mounted a disk 22. The disk extends diagonally from near the bottom and outside of the cup formed by flange 15, through the aperture 17 to the upper limit of the bearing surfaces 18. The disk support being suspended inside the center of gravity of the disk, the disk is held inward by gravity so that its periphery is in contact with the bearing surface of the eccentric 12. The action of gravity is preferably supplemented by a spring 23 secured to the cover plate 19 and bearing at its free end against the support 21. The upper edge of eccentric 12 is provided with an extension 24 which is spaced from the flange 16, the said flange and extension forming an oil receiving well at the upper limit of the bearing surfaces 18. The flange 16 has an extension 25 which covers the oil receiving well and serves to keep out dust as well as to catch oil drops thrown off by the disk 22.

The oil which flows from the bearing surfaces collects in a deep pool in the portion of the cup formed by flange 15 which is furthest removed from the center of rotation of the eccentric. This pool of oil rotates with the eccentric and each time it flows past the disk 22, which is caused to rotate by its contact with the eccentric, some of the oil is picked up by the disk and carried up to the oil receiving well where it is thrown off. Thus the bearing surfaces are continuously supplied with oil.

While I have shown the lubricating device in connection with driving eccentrics, its general applicability to any mechanism having vertical or substantially vertical bearing surfaces, will be apparent, and I wish to cover all such modifications as fall within the scope of the appended claims.

Having described my invention, I claim:

1. In combination with two relatively movable members having substantially vertical mutual bearing surfaces, one of said members having at its lower edge a cup adapted to retain oil flowing from said bearing surfaces, a rotatable disk extending from said cup to the upper limit of said bearing surfaces, and means for rotating said disk.

2. In combination with two relatively movable members having substantially vertical mutual bearing surfaces, one of said members having at its lower edge a cup adapted to retain oil flowing from said bearing surfaces, a disk rotatably mounted upon one of said members and having contact at its periphery with the other member so as to be rotated by the relative motion of said members, said disk extending from said cup to the upper limit of said bearing surfaces.

3. In combination with two relatively rotatable members having substantially vertical mutual bearing surfaces, and an annular cup on the inner one of said members surrounding the outer member and adapted to retain oil flowing from said bearing surfaces, a rotatable disk mounted on the outer member and extending from said annular cup to the upper limit of said bearing surfaces, and means for rotating said disk.

4. In combination with two relatively rotatable members having substantially vertical mutual bearing surfaces, and an annular cup on the inner one of said members surrounding the outer member and adapted to retain oil flowing from said bearing surfaces, a rotatable disk mounted on the outer member and extending from said annular cup through an aperture in said outer member to the upper limit of said bearing surfaces, and means for rotating said disk.

5. In combination with two relatively rotatable members having substantially vertical mutual bearing surfaces, and an annular cup on the inner one of said members surrounding the outer member and adapted to retain oil flowing from said bearing surfaces, a disk rotatably mounted on said outer member and extending from said annular cup to the upper limit of said bearing surfaces, said disk having contact with said inner member so as to be rotated thereby.

6. In combination with two relatively rotatable members having substantially vertical mutual bearing surfaces, and an annular cup on the inner one of said members surrounding the outer member and adapted to retain oil flowing from said bearing surfaces, a support pivotally suspended upon said outer member, a disk rotatably mounted upon said support and extending from said annular cup to the upper limit of said bearing surfaces, said disk having contact with said inner member so as to be rotated thereby, and resilient means for holding said disk in contact with said inner member.

7. In combination with two relatively rotatable members having substantially vertical mutual bearing surfaces, and an annular cup on the inner one of said members surrounding the outer member and adapted to retain oil flowing from said bearing surfaces, a rotatable disk mounted on the outer member and extending from said annular cup to the upper limit of said bearing surfaces, means for rotating said disk, and relatively spaced upright extensions on the upper edges of said inner and outer members adapted to form an oil receiving well at the upper limit of said bearing surfaces.

8. In combination with two relatively rotatable members having substantially vertical mutual bearing surfaces, and an annular cup on the inner one of said members surrounding the outer member and adapted to retain oil flowing from said bearing surfaces, a rotatable disk mounted on the outer member and extending from said annular cup to the upper limit of said bearing surfaces, means for rotating said disk, and relatively spaced upright extensions on the upper edges of said inner and outer members adapted to form an oil receiving well at the upper limit of said bearing surfaces, one of said extensions projecting over said oil receiving well.

9. In combination with a substantially vertically axled eccentric driving mechanism comprising an eccentric and an eccentric ring, said eccentric having on its lower edge an annular cup surrounding the eccentric ring and adapted to retain oil flowing from the bearing surfaces of the eccentric and eccentric ring, a rotatable disk mounted on said eccentric ring and extending from said annular cup to the upper limit of said bearing surfaces, and means for rotating said disk.

10. In combination with a substantially vertically axled eccentric driving mechanism comprising an eccentric and an eccentric ring, said eccentric having on its lower edge an annular cup surrounding the eccentric ring and adapted to retain oil flowing from the bearing surfaces of the eccentric and eccentric ring, a rotatable disk mounted in an aperture in said eccentric ring extending through to said bearing surfaces, said disk having contact with the bearing surface of said eccentric so as to be rotated thereby.

11. In combination with a substantially vertically axled eccentric driving mechanism comprising an eccentric and an eccentric ring, said eccentric having on its lower edge an annular cup surrounding the eccentric ring and adapted to retain oil flowing from the bearing surfaces of the eccentric and eccentric ring, said eccentric ring having a flange extending over said annular cup and an aperture extending through to said bearing surfaces and through said flange, a cover plate covering the opening in said flange, a support pivoted to said cover plate, a disk rotatably mounted on said support, said disk extending from said cup to the upper limit of said bearing surfaces and having contact with said eccentric so as to be rotated thereby.

12. In the combination as set forth in claim 11, a spring secured to said cover plate and adapted to press said disk against said eccentric.

The foregoing specification signed at Oil City, Pennsylvania, this first day of September, 1927.

JOHN REID.